(12) United States Patent
Hsu et al.

(10) Patent No.: US 10,750,183 B2
(45) Date of Patent: Aug. 18, 2020

(54) METHODS AND APPARATUSES OF SAMPLE ADAPTIVE OFFSET PROCESSING FOR VIDEO CODING

(71) Applicant: MEDIATEK INC., Hsin-Chu (TW)

(72) Inventors: Chih-Wei Hsu, Hsinchu (TW); Yu-Wen Huang, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/334,915

(22) PCT Filed: Sep. 19, 2017

(86) PCT No.: PCT/CN2017/102269
§ 371 (c)(1),
(2) Date: Mar. 20, 2019

(87) PCT Pub. No.: WO2018/054286
PCT Pub. Date: Mar. 29, 2018

(65) Prior Publication Data
US 2019/0289294 A1    Sep. 19, 2019

Related U.S. Application Data

(60) Provisional application No. 62/413,468, filed on Oct. 27, 2016, provisional application No. 62/396,908, filed on Sep. 20, 2016.

(51) Int. Cl.
*H04N 7/12* (2006.01)
*H04N 19/132* (2014.01)
(Continued)

(52) U.S. Cl.
CPC ......... *H04N 19/132* (2014.11); *H04N 19/117* (2014.11); *H04N 19/13* (2014.11);
(Continued)

(58) Field of Classification Search
CPC ...... H04N 19/132; H04N 19/14; H04N 19/82; H04N 19/96; H04N 19/70; H04N 19/86;
(Continued)

(56) References Cited

U.S. PATENT DOCUMENTS

2013/0308696 A1    11/2013    Kim et al.
2013/0336382 A1    12/2013    Sole et al.
(Continued)

FOREIGN PATENT DOCUMENTS

CN    104584551 A      4/2015
KR    10-1413154 B1    7/2014
(Continued)

OTHER PUBLICATIONS

International Search Report dated Dec. 8, 2017, issued in application No. PCT/CN2017/102269.
(Continued)

*Primary Examiner* — Richard T Torrente
(74) *Attorney, Agent, or Firm* — McClure, Qualey & Rodack, LLP

(57) ABSTRACT

A video coding system determines a Sample Adaptive Offset (SAO) type for a current reconstructed block, and determines SAO offsets for the current reconstructed block and checks if all SAO offsets are zeros except for a last SAO offset if the SAO type is Edge Offset (EO) or Band Offset (BO). A new value for the last SAO offset is derived at an encoding end or an original value for the last SAO offset is derived at a decoding end if all SAO offsets except for the last SAO offset are zeros. The SAO offsets are used for applying SAO processing to the current block and the current block is encoded or decoded. The original value for the last SAO offset is used in SAO processing and the new value for the last SAO offset is signaled in a video bitstream.

7 Claims, 10 Drawing Sheets

(51) Int. Cl.
  *H04N 19/13* (2014.01)
  *H04N 19/147* (2014.01)
  *H04N 19/176* (2014.01)
  *H04N 19/186* (2014.01)
  *H04N 19/46* (2014.01)
  *H04N 19/14* (2014.01)
  *H04N 19/82* (2014.01)
  *H04N 19/96* (2014.01)
  *H04N 19/70* (2014.01)
  *H04N 19/86* (2014.01)
  *H04N 19/117* (2014.01)

(52) U.S. Cl.
  CPC ........... *H04N 19/14* (2014.11); *H04N 19/147* (2014.11); *H04N 19/176* (2014.11); *H04N 19/186* (2014.11); *H04N 19/46* (2014.11); *H04N 19/70* (2014.11); *H04N 19/82* (2014.11); *H04N 19/86* (2014.11); *H04N 19/96* (2014.11)

(58) Field of Classification Search
  CPC .... H04N 19/117; H04N 19/13; H04N 19/147; H04N 19/176; H04N 19/186; H04N 19/46
  See application file for complete search history.

(56) References Cited

U.S. PATENT DOCUMENTS

| | | |
|---|---|---|
| 2014/0192869 A1 | 7/2014 | Laroche et al. |
| 2015/0124866 A1 | 5/2015 | Fu et al. |
| 2015/0222913 A1 | 8/2015 | Sato |
| 2015/0237376 A1 | 8/2015 | Alshina et al. |

FOREIGN PATENT DOCUMENTS

| | | |
|---|---|---|
| TW | 201424397 A | 6/2014 |
| TW | I481223 B | 4/2015 |
| WO | 2012/142966 A1 | 10/2012 |

OTHER PUBLICATIONS

Fu, C.M., et al.; "Sample Adaptive Offset in the HEVC Standard;" IEEE Transactions on Circuits and Systems for Video Technology; vol. 22; No. 12; Dec. 2012; pp. 1755-1764.

Alshina, E., et al.; "SAO encoder selection bug fix;" Joint Collaborative Team in Video Coding (JCT-VC) of ITU-T SG 16 WP 3 and ISO/IEC JTC 1/SC 29/WG 11; Oct. 2012; pp. 1-6.

Rosewarne, C., et al.; "High Efficiency Video Coding (HEVC) Test Model 16 (HM 16) Improced Encoder Description Update 9;" Joint Collaborative Team in Video Coding (JCT-VC) of ITU-T SG 16 WP 3 and ISO/IEC JTC 1/SC 29/WG 11; Jul. 2017; pp. 1-70.

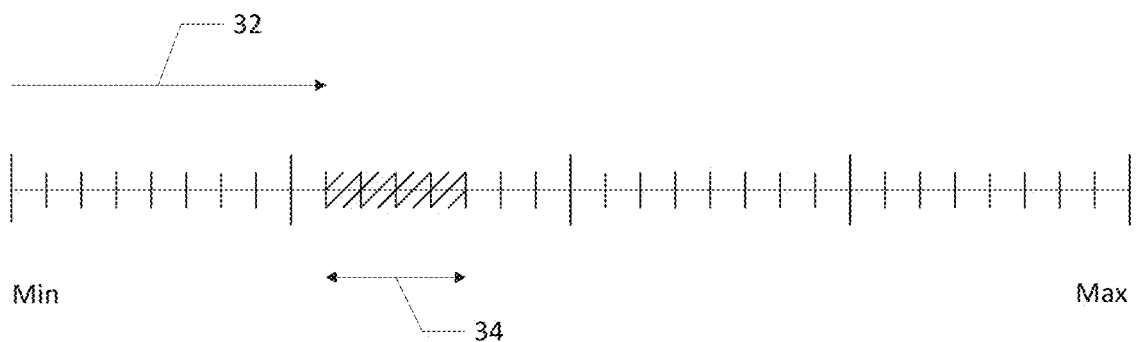
Fig. 3
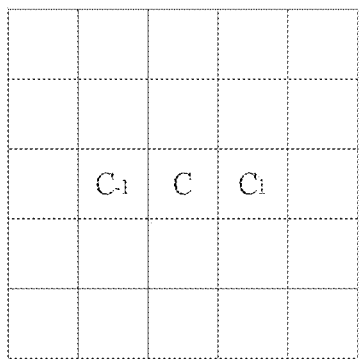 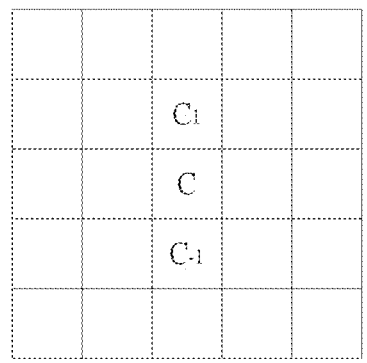
EO0: 0 degree      EO1: 90 degree
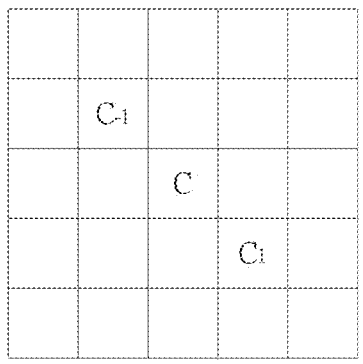 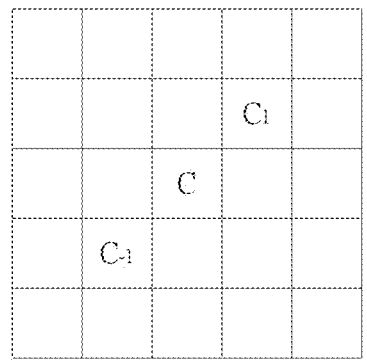
EO2: 135 degree      EO3: 45 degree
Fig. 4

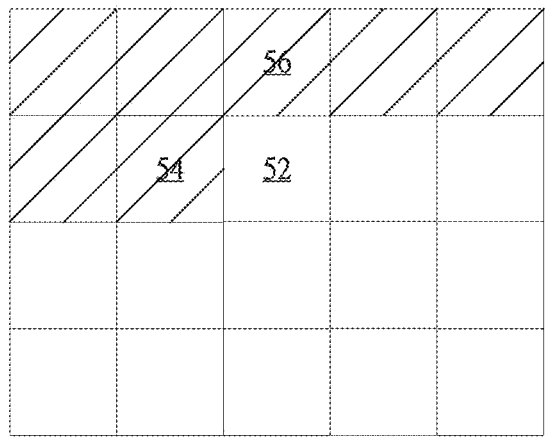

Fig. 5

| sao (rx,ry) { | Descriptor |
|---|---|
|   if (rx > 0) { | |
|     leftCtbInSliceSeg = CtbAddrInRs > SliceAddrRs | |
|     leftCtbInTile = TileId [ CtbAddrInTs] == TileId [CtbAddrRsToTs[CtbAddrInRs-1]] | |
|     if (leftCtbInSliceSeg && leftCtbInTile) | |
|       sao_merge_left_flag | ae(v) |
|   } | |
|   if (ry > 0 && !sao_merge_left_flag) { | |
|     upCtbInSliceSeg = (CtbAddrInRs - PicWidthInCtbY) >= SliceAddrRs | |
|     upCtbInTile = TileId [CtbAddrInTs] == TileId [CtbAddrRsToTs [CtbAddrInRs - PicWidthInCtbsY]] | |
|     if (upCtbInSliceSeg && upCtbInTile) | |
|       sao_merge_up_flag | ae(v) |
|   } | |
|   if (!sao_merge_up_flag && !sao_merge_left_flag) | |
|     sao_param (rx,ry) | |
| } | |

Fig. 6

| sao_param (rx,ry) { | Descriptor |
|---|---|
|   for (cIdx = 0; cIdx < 3; cIdx++) | |
|     if ((slice_sao_luma_flag && cIdx == 0) \|\| <br>     ( slice_sao_chroma_flag && cIdx > 0)) { | |
|       if (cIdx == 0) | |
|         sao_type_idx_luma | ae(v) |
|       else if (cIdx == 1) | |
|         sao_type_idx_chroma | ae(v) |
|       if (SaoTypeIdx[cIdx][rx][ry] != 0) { | |
|         for (i=0; i<4; i++) | |
|           sao_offset_abs[cIdx][rx][ry][i] | ae(v) |
|         if (SaoTypeIdx[cIdx][rx][ry] == 1) { | |
|           for (i=0; i<4; i++) | |
|             if (sao_offset_abs[cIdx][rx][ry][i] != 0) | |
|               sao_offset_sign[cIdx][rx][ry][i] | ae(v) |
|           sao_band_position[cIdx][rx][ry] | ae(v) |
|         } else { | |
|           if (cIdx == 0) | |
|             sao_eo_class_luma | ae(v) |
|           if (cIdx == 1) | |
|             sao_eo_class_chroma | ae(v) |
|         } | |
|       } | |
|     } | |

Fig. 7

| sao_param (rx,ry) { | Descriptor |
|---|---|
|   for (cIdx = 0; cIdx < 3; cIdx++) | |
|     if ((slice_sao_luma_flag && cIdx == 0) \|\| <br>    ( slice_sao_chroma_flag && cIdx > 0)) { | |
|       if (cIdx == 0) | |
|         sao_type_idx_luma | ae(v) |
|       else if (cIdx == 1) { | |
|         if (leftCtbInSliceSeg && leftCtbInTile) | |
|           sao_chroma_merge_left_flag | ae(v) |
|         if (!sao_chroma_merge_left_flag) | |
|           sao_type_idx_chroma | ae(v) |
|     } if (cIdx == 0 \|\| (cIdx != 0 && !sao_chroma_merge_left_flag)) { | |
|       if (SaoTypeIdx[cIdx][rx][ry] != 0) { | |
|         for (i=0; i<4; i++) | |
|           sao_offset_abs[cIdx][rx][ry][i] | ae(v) |
|         if (SaoTypeIdx[cIdx][rx][ry] == 1) { | |
|           for (i=0; i<4; i++) | |
|             if (sao_offset_abs[cIdx][rx][ry][i] != 0) | |
|               sao_offset_sign[cIdx][rx][ry][i] | ae(v) |
|           sao_band_position[cIdx][rx][ry] | ae(v) |
|         } else { | |
|           if (cIdx == 0) | |
|             sao_eo_class_luma | ae(v) |
|           if (cIdx == 1) | |
|             sao_eo_class_chroma | ae(v) |
|         } | |
|       } | |
|     } | |
| } | |

Fig. 9

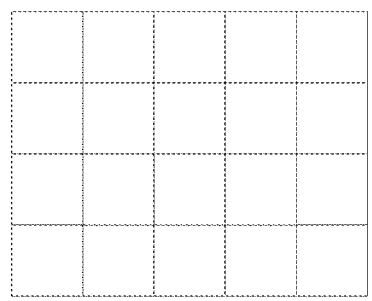
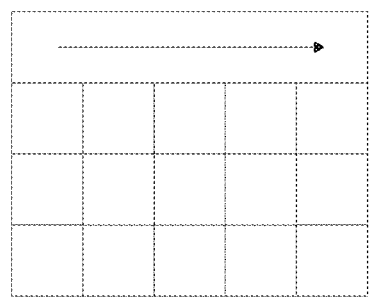
Fig. 11AFig. 11B
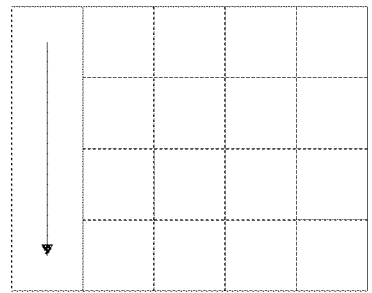
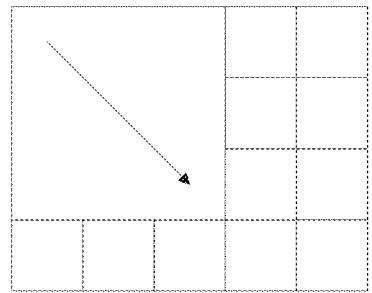
Fig. 11CFig. 11D

METHODS AND APPARATUSES OF SAMPLE ADAPTIVE OFFSET PROCESSING FOR VIDEO CODING

CROSS REFERENCE TO RELATED APPLICATIONS

The present invention claims priority to U.S. Provisional Patent Application, Ser. No. 62/396,908, filed Sep. 20, 2016, entitled "Constrained Offset Values for Sample Adaptive Offset" and U.S. Provisional Patent Application, Ser. No. 62/413,468, filed Oct. 27, 2016, entitled "Sharing Sample Adaptive Offset Parameters by Grouping CTUs and Signaling Chroma Merge Flag". The U.S. Provisional Patent Applications are hereby incorporated by reference in their entireties.

FIELD OF INVENTION

The present invention relates to sample adaptive offset (SAO) processing in video coding systems. In particular, the present invention relates to encoding or decoding of SAO information for SAO processing.

BACKGROUND OF THE INVENTION

High Efficiency Video Coding (HEVC) is the latest international video coding standard developed by the Joint Collaborative Team on Video Coding (JCT-VC) group of video coding experts from ITU-T Study Group. The HEVC standard relies on a block-based coding structure which divides a picture into multiple non-overlapped square Coding Tree Units (CTUs). Each CTU consists of multiple Coding Tree Blocks (CTBs) and each CTB is for one color component. FIG. 1 illustrates an exemplary system block diagram of a Video Encoder 100 based on the HEVC standard. Intra Prediction 110 provides intra predictors based on reconstructed blocks of a current picture, and Inter Prediction 112 performs motion estimation (ME) and motion compensation (MC) to provide inter predictors based on video data from other picture or pictures. Switch 114 selects an intra predictor from Intra Prediction 110 or an interpredictor from Inter Prediction 112 for each block in the current picture. The selected predictor is supplied to Adder 116 to be subtracted from the input video data in order to form prediction errors, also called residues. The prediction errors are then processed by Transformation (T) 118 followed by Quantization (Q) 120. The transformed and quantized residues are then coded by Entropy Encoder 134 to form a video bitstream corresponding to the compressed video data. The video bitstream associated with the transform coefficients is then packed with side information. The side information may also be subject to entropy coding to reduce required bandwidth. Accordingly, the data associated with the side information are provided to Entropy Encoder 134 as shown in FIG. 1. When an interprediction mode is used, a reference picture or pictures have to be reconstructed at the encoder end as well. Consequently, the transformed and quantized residues are processed by Inverse Quantization (IQ) 122 and Inverse Transformation (IT) 124 to recover the residues. The residues are then added back to the selected predictors at Reconstruction (REC) 126 to produce reconstructed blocks. The reconstructed blocks may be stored in Reference Picture Buffer 132 and used for prediction of other pictures.

As shown in FIG. 1, incoming video data undergoes a series of processing in the video encoding system. The reconstructed blocks generated from REC 126 may be subject to various impairments due to a series of encoding processing. Accordingly, various in-loop processing is applied to the reconstructed blocks before the reconstructed blocks are stored in the Reference Picture Buffer 132 in order to improve video quality. In the HEVC standard, Deblocking Filter (DF) 128 and Sample Adaptive Offset (SAO) 130 are applied to the reconstructed blocks before storing in the Reference Picture Buffer 132 to enhance picture quality. The in-loop filter information may have to be incorporated in the video bitstream so that a decoder can properly recover the required information. For example, SAO information from SAO 130 is provided to Entropy Encoder 134 for incorporation into the video bitstream.

In the HEVC standard, SAO processing is utilized to reduce the distortion in the reconstructed blocks. FIG. 2 illustrates a system block diagram of an exemplary HEVC-based Video Decoder 200 including Deblocking Filter (DF) 224 and Sample Adaptive Offset (SAO) 226. Entropy Decoder 210 is used to parse and recover the coded syntax elements related to residues, motion information and other control data. Switch 216 selects Intra Prediction 212 or Inter Prediction 214 according to decoded mode information, and the selected predictors are supplied to reconstruction (REC) 218 to be combined with the recovered residues. Besides performing entropy decoding on compressed video data, Entropy Decoder 210 is also responsible for entropy decoding of side information and provides the side information to respective blocks. For example, intra mode information is provided to Intra Prediction 212, inter mode information is provided to Inter Prediction 214, sample adaptive offset information is provided to SAO 226 and residues are provided to Inverse Quantization (IQ) 220. The residues are processed by IQ 220, Inverse Transformation (IT) 222 and subsequent reconstruction process to produce reconstructed blocks. The reconstructed blocks are further processed by DF 224 and SAO 226 to generate final decoded video. If the currently decoded picture is a reference picture, the final decoded video of the currently decoded picture is also stored in Ref. Pict. Buffer 228 for later pictures in decoding order.

The concept of SAO is to classify the reconstructed pixels in a reconstructed block into categories according to pixel intensities in the reconstructed block. Each category is then assigned an offset coded in the video bitstream and the distortion of the reconstructed block is reduced by adding the offset to the reconstructed pixels in each category. In the HEVC standard, the SAO tool supports two kinds of pixel classification methods: band offset (BO) and edge offset (EO). For each color component (luminance or chrominance), the SAO algorithm divides a picture into non-overlapped regions, and each region selects one SAO type among BO, four EO types, and no process (OFF). The SAO partitioning in the HEVC standard is aligned with the coding tree block (CTB) boundaries to facilitate the CTB-based processing.

For BO, the reconstructed pixels in a region are classified into bands by quantizing the pixel intensities, and the pixel intensity range from a minimum value to a maximum value is equally divided into 32 bands as shown in FIG. 3. Four consecutive bands are subjective to band offset processing, and an offset is derived for each band of the four consecutive bands to reduce the distortion of the reconstructed pixels in the four consecutive bands. The four consecutive bands are located by a syntax element sao_band_position which indicates the starting band of the four consecutive bands. An exemplary four-band group 34 is illustrated in FIG. 3, and the starting band position of this four-band group 34 is indicated by an arrow 32 derived from the syntax element sao_band_position. Four offsets identified by the starting band position are coded into the video bitstream.

For EO, the reconstructed pixels in a region are classified into categories by comparing a current pixel with its neighboring pixels along the direction identified by the EO type as shown in FIG. 4. Table 1 lists the decision for the EO pixel classification according to the HEVC standard, where "C" denotes a current pixel to be classified. The four EO types with selections of neighboring pixels for different orientations are also shown in FIG. 4. The four EO types corresponding to orientations 0°, 90°, 135°, and 45°, where "$C_1$" and "$C_{-1}$" are the neighboring pixels corresponding to a given EO type as shown in FIG. 4. An offset is derived for all pixels in each category. Four offsets corresponding to category indices 1 through 4 respectively, are coded for one coding tree block (CTB) in the HEVC standard, where reconstructed pixels belong to category index 0 are not compensated by any offset.

TABLE 1

| Categ | Condition |
|---|---|
| 1 | C < two neighbors |
| 2 | C < one neighbor && C == one |
| 3 | C > one neighbor && C == one |
| 4 | C > two neighbors |
| 0 | None of the above |

SAO information including SAO merging information, SAO type information, and offset information, are interleaved into slice data if SAO is enabled in the current slice. To further reduce side-information, SAO parameters including the SAO type information and offset information of a current CTB can reuse those of its upper or left CTB by using SAO Merge information. Syntax elements for the SAO information consist of sao_merge_left_flag, sao_merge_up_flag, sao_type_idx_luma, sao_type_idx_chroma, sao_eo_class_luma, sao_eo_class_chroma, sao_band_position, sao_offset_abs, and sao_offset_sign. FIG. 5 illustrates merging of SAO regions according to the SAO merging information. In FIG. 5, each block is a region such as a CTB, and the shaded blocks are CTBs after SAO processing. Syntax element sao_merge_left_flag is used to indicate whether a current CTB 52 reuses the SAO parameters of its left CTB 54. The syntax element sao_merge_up_flag is used to represents whether the current CTB 52 reuses the SAO parameters of its upper CTB 56. The syntax element sao_type_idx represents the selected SAO type (i.e., sao_type_idx_luma and sao_type_idx_chroma for luma component and chroma component respectively). The syntax elements sao_eo_class_luma and sao_eo_class_chroma represent the selected EO type for luma component and chroma component respectively. The syntax element sao_band_position represents the starting band position of the selected bands. SAO processing is applied separately to different color components of the video data, and the color components may correspond to (Y, Cb, Cr), (Y, U, V) or (R, G, B).

A current CTU can reuse SAO parameters of its left neighboring CTU by setting the syntax element sao_merge_left_flag to true, or the current CTU can reuse SAO parameters of its above CTU by setting the syntax element sao_merge_up_flag to true, or the current CTU can have new SAO parameters by transmitting a new set of SAO type information and offset information. FIG. 6 illustrates exemplary syntax design for signaling the SAO information for a current block and FIG. 7 illustrates exemplary syntax design for signaling SAO parameters for the current block. In FIG. 6, the SAO merging information is signaled to indicate whether the current block reuses SAO parameters of a neighboring block. If the current block is not merged with any neighboring CTU for SAO processing, EO or BO is selected as the SAO type and four offsets are transmitted for each color component as shown in FIG. 7. The syntax element sao_offset_abs represents the offset magnitude and the syntax element sao_offset_sign represents the offset sign. CIdx indicates a color component index, for example, cIdx=0, 1, 2 correspond to color components Y, Cb, and Cr. The syntax element sao_offset_abs is entropy coded according to the existing HEVC standard using truncated Rice (TR) binarization process. The TR codes comprise a prefix part represented by truncated unary (TU) codes and a remainder part represented by fixed-length codewords without truncation.

While SAO processing in the existing HEVC standard is able to improve performance by adaptively compensate the local intensity offsets, it is desirable to further improve the performance whenever possible in order to achieve an overall efficiency target.

SUMMARY OF THE INVENTION

Methods and apparatuses of video processing including SAO (sample adaptive offset) processing in a video coding system to improve the performance are disclosed. In one embodiment, the video coding system receives input data associated with a current reconstructed block in a current picture, and determines a SAO type for the current reconstructed block. The SAO type is selected from Edge Offset (EO), Band Offset (BO), and OFF. The video coding system determines a plurality of SAO offsets for the current reconstructed block and checks if all SAO offsets are zeros except for a last SAO offset if the SAO type for the current reconstructed block is EO or BO. If all SAO offsets except for the last SAO offset are zeros, a new value for the last SAO offset is derived when encoding the current reconstructed block, or an original value for the last SAO offset is derived when decoding the current reconstructed block. The new value for the last SAO offset is derived by subtracting the original value for the last SAO offset by one, and the original value for the last SAO offset is derived by adding one to a received value for the last SAO offset. The current reconstructed block is processed by SAO processing according to the SAO offsets, and the current reconstructed block is encoded or decoded. The original value for the last SAO offset is used in SAO processing and the new value for the last SAO offset is signaled in a video bitstream.

In some embodiments, if the current reconstructed block is for a luminance (luma) component, four SAO offsets are determined for the current reconstructed block, and the last SAO offset is the fourth SAO offset; and if the current reconstructed block is for a chrominance (chroma) component, eight SAO offsets are determined for the current reconstructed block and another reconstructed block for another chroma component, and the last SAO offset is the eighth SAO offset. The SAO processing is skipped if the SAO type for the current reconstructed block is OFF. An embodiment of the current reconstructed block is a Coding Tree Block (CTB).

In another embodiment, a chroma merge flag is signaled to indicate whether a current chroma block is merged with a neighboring block during SAO processing, in other words, the chroma merge flag indicates whether SAO parameters of the neighboring block are reused by the current chroma block. The chroma merge flag is not used to indicate SAO merging of a corresponding luma block of the current chroma block. SAO parameters for the current chroma block are derived from SAO parameters of a neighboring block of the current chroma block if the chroma merge flag indicates reusing the SAO parameters of the neighboring block. SAO parameters for the current chroma block are derived from a video bitstream at a decoding end or new SAO parameters are derived and signaled in the video bitstream at an encoding end if the chroma merge flag indicates not reusing the SAO parameters of the neighboring block. The current chroma block is processed by SAO processing according to the derived SAO parameters and the current chroma block is encoded or decoded. An example of the chroma merge flag is a chroma merge-left flag, and the neighboring block is a left block of the current chroma block. Another example of the chroma merge flag is a chroma merge-up flag, and the neighboring block is an above block of the current chroma block. In yet another example, two chroma merge flags may be signaled, similar to the two SAO merge flags used in the HEVC standard, a chroma merge-up flag is signaled after a chroma merge-left flag, and the SAO parameters of the current chroma block are derived from SAO parameters of a left block if the chroma merge-left flag indicates merging or from SAO parameters of an above block if the chroma merge-up flag indicates merging. Some embodiments signal the chroma merge flag for the current chroma block only when the corresponding luma block is not merged with any neighboring block of the corresponding luma block. Syntax of the chroma merge flag may be context coded by Context-adaptive Binary Arithmetic Coding (CABAC).

In yet another embodiment, a video encoding system receives input data associated with a group of reconstructed blocks in a current picture, and combined SAO parameters for the group of reconstructed blocks are based on statistics of all the reconstructed blocks in the group. Each reconstructed block in the group is at least a neighboring block of another reconstructed block in the group. The video encoding system applies SAO processing to each reconstructed block in the group according to the derived SAO parameters, and a first processed constructed block in the group is encoded by incorporating the derived combined SAO parameters and remaining reconstructed blocks in the group are encoded by incorporating an SAO merge flag for each of the remaining reconstructed blocks. The video encoding system may adaptively select to derive SAO parameters according to statistics of an individual reconstructed block or according to the statistics of all reconstructed blocks in the group. For example, the video encoding system derives multiple sets of individual SAO parameters for the reconstructed blocks in the group, and each set of individual SAO parameters is derived based on statistics of a single reconstructed block in the group. The video encoding system decides whether to apply SAO processing to the reconstructed blocks in the group according to the derived combined SAO parameters or the derived multiple sets of individual SAO parameters, and the reconstructed blocks in the group are encoded by incorporating the derived multiple sets of individual SAO parameters if the derived multiple sets of individual SAO parameters are used in the SAO processing. In an example, the video encoding system computes a combined rate-distortion cost associated with processing the reconstructed blocks in the group using the derived combined SAO parameters and also computes individual rate-distortion costs associated with processing the reconstructed blocks in the group using the derived multiple sets of individual SAO parameters. The combined rate-distortion cost is compared with a sum of the individual rate-distortion costs, and the SAO parameters corresponding to the lower cost between the combined rate-distortion cost and the sum of the individual rate-distortion costs are selected. An example of the group of reconstructed blocks is a CTU row, the first processed reconstructed block is a left-most CTU in the CTU row, and the SAO merge flag for each of the remaining reconstructed blocks is a merge-left flag. Another example of the group of reconstructed blocks is a CTU column, the first processed reconstructed block is a top-most CTU in the CTU column, and the SAO merge flag for each of the remaining reconstructed block is a merge-up flag. Another example of the group of reconstructed blocks is composed of M×N CTUs, the first processed reconstructed block is a top-left CTU in the group, and the SAO merge flag for each CTU in a left-most row is a merge-up flag and the SAO merge flag for each of other CTUs in the group is a merge-left flag.

The above individual embodiments of video processing including SAO processing may also be combined.

BRIEF DESCRIPTION OF THE DRAWINGS

FIG. 3 illustrates band offset (BO) in SAO processing which partitions pixel intensities into 32 bands according to the High Efficiency Video Coding (HEVC) standard.

FIG. 4 illustrates the four edge offset (EO) types corresponding to 0-degree, 90-degree, 135-degree and 45-degree according to the High Efficiency Video Coding (HEVC) standard.

FIG. 5 illustrates SAO information sharing with a neighboring block, where the current block may reuse SAO parameters of its left or above neighboring block.

FIG. 6 illustrates an exemplary syntax design for signaling SAO merging information for a current CTU.

FIG. 7 illustrates an exemplary syntax design for signaling SAO type information and offset information for the current CTU if the current CTU is not merged to any neighboring block.

FIG. 9 illustrates an exemplary syntax design to incorporate a new syntax element chroma merge-left flag in the CTU level according to an embodiment of the present invention.

FIG. 11A illustrates the conventional CTU-based SAO parameters decision.

FIGS. 11B-11D illustrate some examples of grouping CTUs to derive SAO parameters according to an embodiment of the present invention.

DETAILED DESCRIPTION

In order to improve the performance of SAO processing in the existing High Efficiency Video Coding (HEVC) standard, embodiments of modified SAO processing are disclosed. Some of the modified SAO processing involves modified encoding or decoding processing without introducing new syntax elements, and some other modified SAO processing involves modified encoding or decoding processing along with introduction of new syntax elements.

Figure 1:
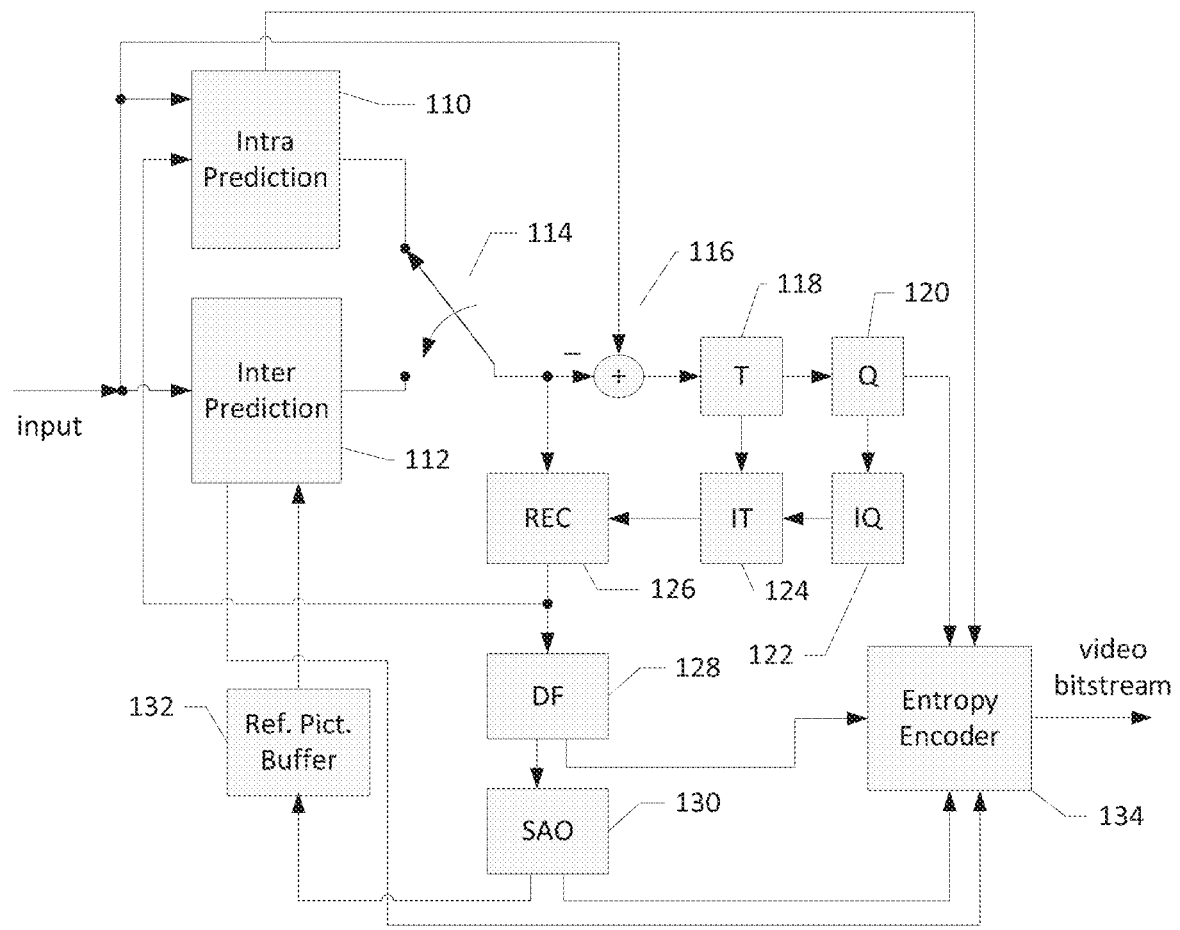
FIG. 1 illustrates a block diagram of an exemplary video encoding system based on the High Efficiency Video Coding (HEVC) standard incorporating sample adaptive offset (SAO) processing.
Figure 2:
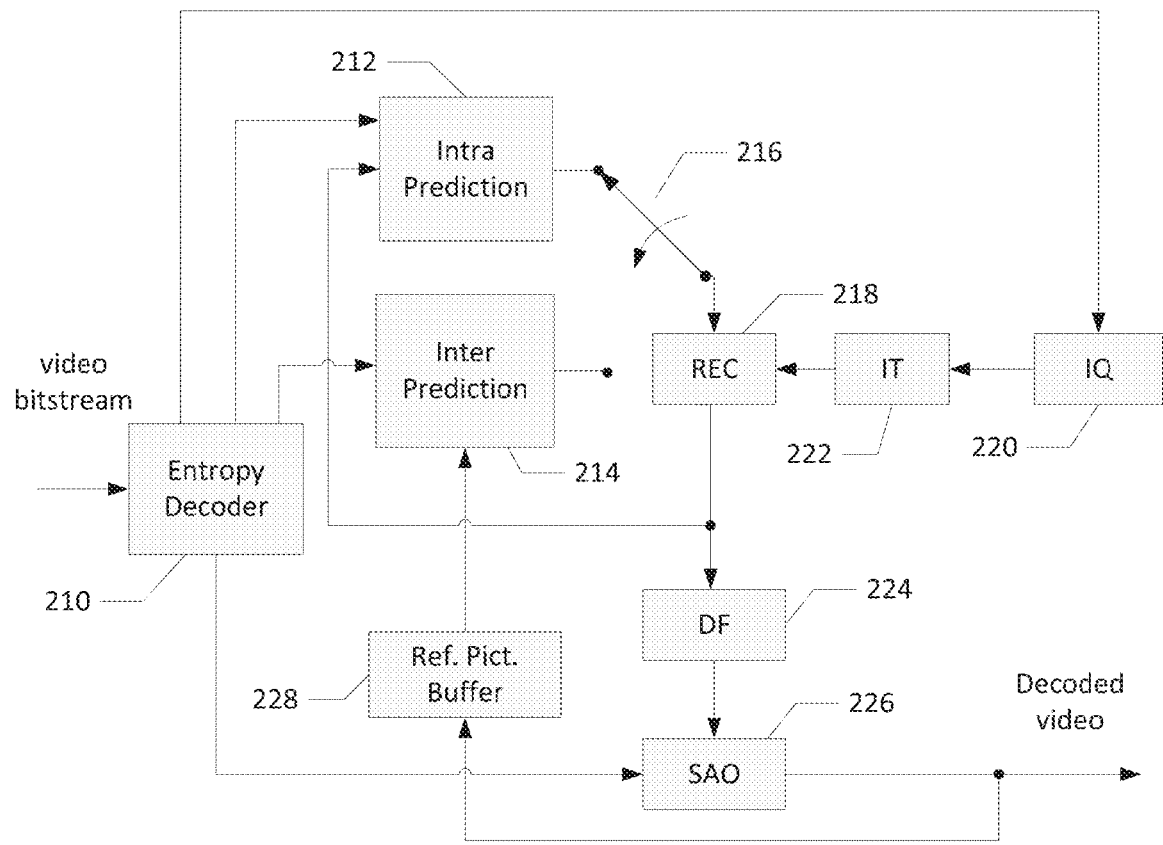
FIG. 2 illustrates a block diagram of an exemplary video decoding system based on the High Efficiency Video Coding (HEVC) standard incorporating sample adaptive offset (SAO) processing.

Constrain the last offset value to be nonzero In one embodiment according to the present invention, when all previous SAO offsets for a current reconstructed block are zeros, the last SAO offset for the current reconstructed block is constrained to be nonzero for both luminance (luma) and chrominance (chroma) components. SAO 130 in Video Encoder 100 as shown in FIG. 1 selects one SAO type among BO, EO, and OFF (SAO processing is turned off) for a current reconstructed block according to an algorithm such as rate-distortion optimization (RDO). The current reconstructed block may be a CTB defined in the HEVC standard. If the encoder selects BO, four offsets are transmitted along with a starting band position (sao_band_position); and if the encoder selects EO, four offsets are transmitted along with an EO class (sao_eo_class_luma or sao_eo_class_chroma). The two chroma components Cb and Cr share the SAO type and EO class but Cb and Cr have different SAO offsets, so a total of eight SAO offsets are transmitted together. Embodiments of the present invention prohibit all four SAO offsets chosen for the luma component or all eight SAO offsets chosen for the chroma components to be zero by constraining the last SAO offset to be nonzero. The encoder should not select BO or EO if all the SAO offsets are zeros because the encoder should select OFF to reduce the side information by avoid transmitting the SAO offsets. The last offset of the four SAO offset for the luma component is constrained to be nonzero if the first three SAO offsets are all zeros. Since Cb and Cr components share the same SAO type and EO class, only the last offset of the eight offsets for the chroma components is constrained if the first seven SAO offsets are all zeros.

An exemplary video encoder of the present invention checks if three preceding SAO offsets are zeros for the luma component when processing a current reconstructed block by EO or BO, and the video encoder transmits the fourth SAO offset as an absolute original value subtracted by one (sao_offset_abs-1) if the three preceding SAO offsets are zeros. Similarly, the video encoder checks if seven preceding offsets are zeros for the chroma components, and the video encoder transmits the eighth SAO offset as an absolute original value subtracted by one if the seven preceding SAO offsets are all zeros. When a corresponding video decoder parses the SAO offsets for a current reconstructed block, the fourth SAO offset for the luma component is recovered by adding one to the received value for the last SAO offset (sao_offset_abs-1) signaled in the video bitstream, or the eighth SAO offset for the chroma component is recovered by adding one to the received value for the last SAO offset signaled in the video bitstream. In another embodiment, an exemplary video encoder checks if all SAO offsets for a current reconstructed block are zeros, and changes the SAO type from EO or BO to OFF if all SAO offsets are zeros in order to reduce the SAO side information signaled in the video bitstream.

Figure 8:
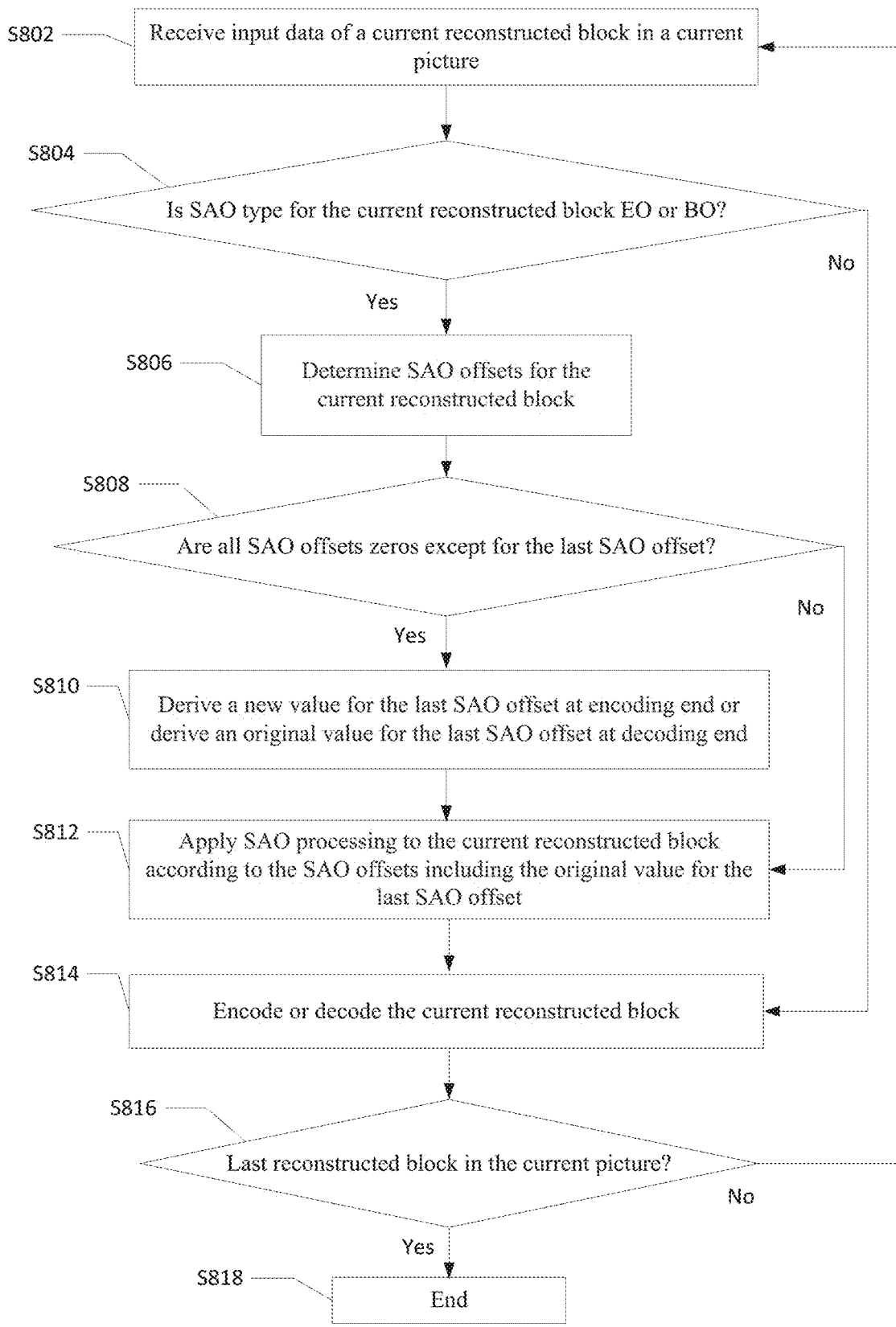
FIG. 8 illustrates a flowchart of an exemplary video process including SAO processing in a video coding system in accordance with an embodiment of the present invention.

FIG. 8 illustrates a flowchart of an exemplary process of processing reconstructed blocks in a current picture in a video coding system according to at least some embodiments of the present invention. The video coding system receives input data of a current reconstructed block in a current picture in step S802, and determines if a SAO type for the current reconstructed block is EO or BO in step S804. If the SAO type is EO or BO instead of OFF, the video coding system determines SAO offsets for the current reconstructed block in step S806. For each to-be processed pixel, BO uses the pixel intensity to classify the pixel into a band, and EO classifies the pixel based on pixel configurations in a 3×3 window. Upon classification of all pixels in the current reconstructed block according to the SAO type, one offset is derived and transmitted for each group of pixels at the encoder end or the offsets are received from the video bitstream at the decoder end. If the SAO type is OFF, the video coding system skips SAO processing for the current reconstructed block and the current reconstructed block is encoded or decoded in step S814. In step S808, the SAO offsets for the current reconstructed block are checked to determine if all SAO offsets are zeros except for a last SAO offset. There are four SAO offsets if the current reconstructed block is a luma block and eight SAO offsets if the current reconstructed block is a chroma block. If all SAO offsets are zero except for the last SAO offset, a new value is derived to replace the last SAO offset at the encoder end or an original value for the last SAO offset is derived from a received value at the decoder end in step S810. The new value for the last SAO offset is derived by subtracting an original value for the last SAO offset by one at the encoder end, and the original value for the last SAO offset is derived by adding one to the received value for the last SAO offset at the decoder end. If the checking result of step S808 is negative, the SAO values are unchanged. The video coding system applies SAO processing to the current reconstructed block according to the SAO offsets including the original value for the last SAO offset in step S812. The current reconstructed block is then encoded or decoded in step S814. The video coding system checks if the current reconstructed block is the last block in the current picture in step S816, and repeats the video processing for a subsequent reconstructed block from step S802 to step S814 if the current reconstructed block is not the last block, else the video processing ends at step S818.

CTU-level syntax for reusing SAO parameters for chroma components SAO merging information defined in the HEVC standard are used to indicate whether a current CTB is merged to one of a neighboring CTB for both luma and chroma components. For example, new SAO parameters including the SAO type information and offset information for both luma and chroma blocks are transmitted in a video bitstream if corresponding SAO merge flags indicate the luma and chroma blocks are not merged to any neighboring block. When the luma block requires new SAO parameters, the corresponding chroma blocks cannot be merged to its neighboring block, and new SAO parameters for the chroma blocks have to be signaled. Some embodiments of the present invention allow the chroma blocks to reuse SAO parameters of a neighboring block even when the corresponding luma block decides to transmit new SAO parameters.

FIG. 9 illustrates an exemplary syntax design for signaling SAO type information and offset information according to an embodiment, where a new CTU-level syntax chroma merge-left flag (sao_chroma_merge_left_flag) is inserted to allow the chroma block to reuse SAO parameters of a left neighboring block of the chroma block. In this embodiment, the chroma merge-left flag is signaled after determining that the corresponding luma block is not merged with any neighboring block for SAO processing, and once this chroma merge-left flag is set to be true, other chroma SAO information does not have to be transmitted as the chroma SAO parameters can be derived from the left neighboring block of the chroma block. For example, the chroma block and the corresponding luma block are CTBs in the same CTU. In this embodiment, one or more SAO merge flags are signaled before signaling the SAO parameters such as SAO type information and offset information as shown in FIG. 9, and the SAO merge flags indicate whether the SAO parameters of a neighboring block are reused by the current block for both the luma and chroma components. No more SAO information for both the luma and chrom blocks needs to be signaled if one of the SAO merge flags is set to be true. SAO parameters for the luma block are only derived by the processing shown in FIG. 9 when the luma block is not merged with any neighboring block for SAO processing, which means the chroma merge-left flag is only signaled when the luma block is not merged with any of its neighboring block for SAO processing. Under this syntax design, if the luma block decides to reuse SAO parameters of a neighboring block of the luma block, the chroma blocks also have to reuse SAO parameters of respective neighboring blocks, if the luma block decides to transmit new SAO parameters, the chroma blocks may select to transmit new SAO parameters or reuse neighboring SAO parameters.

The chroma merge-left flag illustrated in FIG. 9 is signaled for the current chroma block only when the corresponding luma block of the current chroma block is not merged for SAO processing. In some other embodiments, one or more chroma merge flags and one or more luma merge flags may be independently signaled as SAO merging of the chroma and luma blocks are independently determined. The syntax design for these embodiments with an independently signaled chroma merge flag may be similar to the syntax design shown in FIG. 6, for example, the original syntax elements sao_merge_left_flag and sao_merge_up_flag only indicate SAO merging for the current luma block and one or more new chroma merge flags are signaled in a similar way to indicate SAO merging for the current chroma block. The video decoding system determines whether the luma block and corresponding chroma blocks reuse SAO parameters of their neighboring blocks according to the luma merge flags and the chroma merge flags respectively. Compared to the conventional SAO merge flags which are used to control both luma and chroma blocks, the chroma merge flag of the present invention is not used to control whether a corresponding luma block of the current chroma block reuses neighboring SAO parameters.

In another embodiment, a new syntax chroma merge-up flag is used instead of the chroma merge-left flag as shown in FIG. 9. The chroma merge-up flag indicates whether the chroma block is to be merged with an above block of the chroma block for SAO processing. The chroma block reuses SAO parameters of the above block if the chroma merge-up flag is set to be true. Similar syntax design as shown in FIG. 9 may be applied to the chroma merge-up flag, such that the chroma merge-up flag is only signaled when the corresponding luma block is not merged with its neighboring block for SAO processing.

The previous described embodiments only signal one chroma merge flag to allow the chroma block to reuse SAO parameters of a neighboring block in one direction. In some other embodiments, both the chroma merge-left flag and chroma merge-up flag are signaled to allow the chroma block to be merged with one neighboring block selected from the left neighboring block and the above neighboring block. The chroma merge-left flag may be signaled before the chroma merge-up flag so the chroma merge-up flag is signaled only when the chroma merge-left flag indicates the current chroma block is not merged to the left neighboring block for SAO processing. Alternatively, the chroma merge-up flag may be signaled before the chroma merge-left flag and the chroma merge-left flag is signaled only when the chroma merge-up flag indicates the current chroma block is not merged to the above neighboring block for SAO processing. The SAO merge-left flag and the SAO merge-up flag may be context-coded by Context-adaptive Binary Arithmetic Coding (CABAC).

Figure 10:
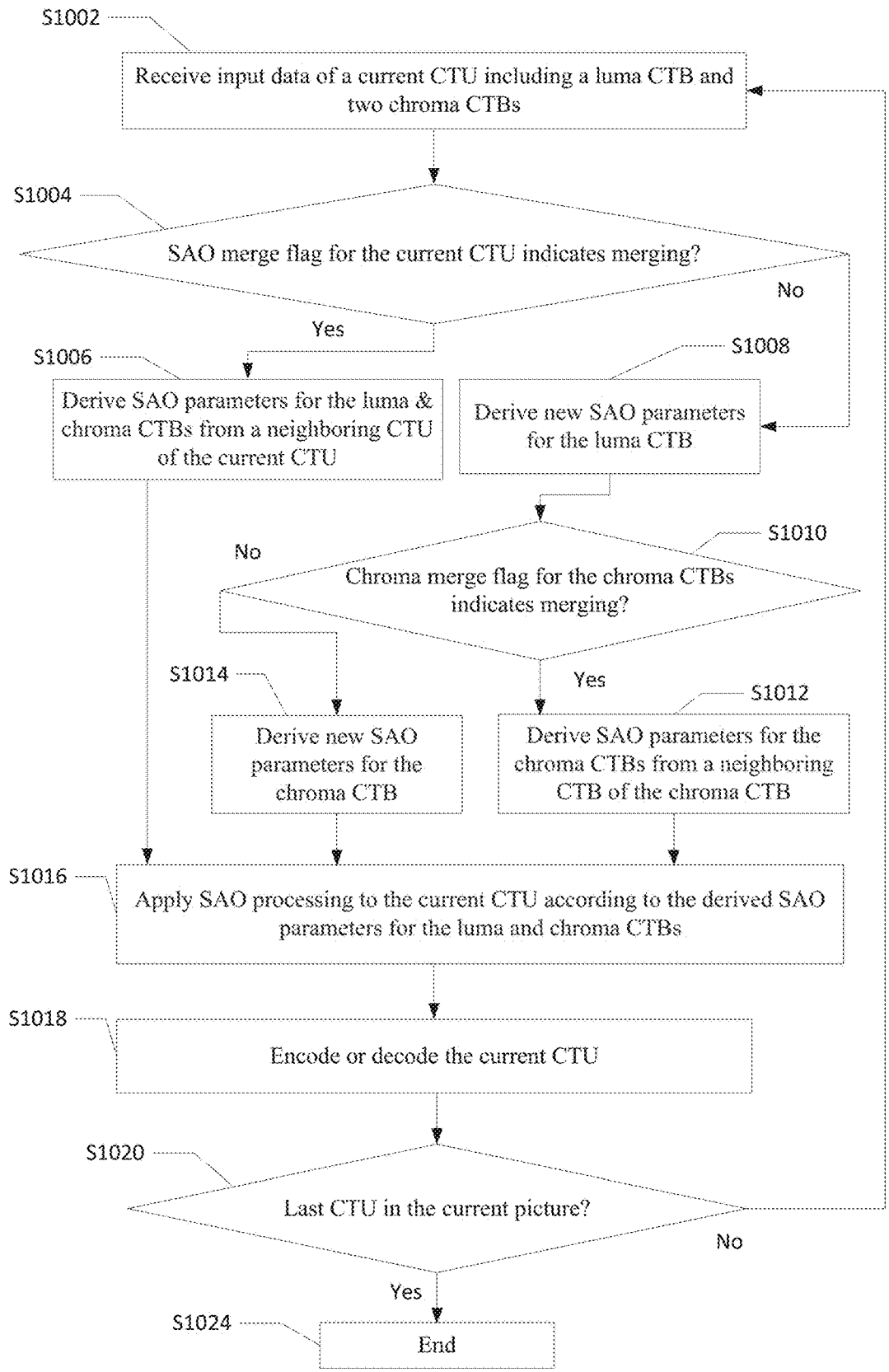
FIG. 10 illustrates a flowchart of an exemplary video process including SAO processing in a video coding system in accordance with another embodiment of the present invention.

FIG. 10 is a flowchart of an exemplary process of video processing in a video coding system in accordance with another implementation of the present invention. The video coding system receives input data of a current CTU in a current picture in step S1002, and checks if a SAO merge flag for the current CTU indicates SAO merging in step S1004. The current CTU comprises one luma CTB and two luma CTBs, and SAO parameters for the luma and chroma CTBs are derived from a neighboring CTU of the current CTU in step S1006 if the checking result of step S1004 is affirmative, else the video coding system derives new SAO parameters for the luma CTB in step S1008. The new SAO parameters for the luma CTB are derived by the SAO algorithm at the encoding end to reduce the distortion of the reconstructed pixels or the new SAO parameters for the luma CTB are derived from the video bitstream at the decoding end. The video coding system further checks if a chroma merge flag for the chroma CTBs indicate merging in step S1010, where the chroma merge flag may be a chroma merge-left flag, a chroma merge-up flag, or both the chroma merge-left flag and the chroma merge-up flag. If the chroma merge flag indicates the chroma CTBs are merged to respective neighboring CTBs for SAO processing, SAO parameters for the chroma CTBs are derived from the neighboring CTBs of the chroma CTBs in step S1012, else new SAO parameters for the chroma CTB are derived in step S1014. The new SAO parameters for the chroma CTBs are derived by the SAO algorithm at the encoding end to reduce the distortion of the reconstructed pixels or the new SAO parameters for the chroma CTB are derived from the video bitstream at the decoding end. After deriving the SAO parameters for both the luma and chroma CTBs of the current CTU, the video coding system applies SAO processing to the current CTU in step S1016 and encodes or decodes the current CTU in step S1018. In step S1020, the video coding system checks if the current CTU is the last CTU in the current picture, repeats the video processing for a subsequent CTU from step S1002 if the current CTU is not the last one, or terminates the process in step S1024.

SAO parameters decided by multiple CTUs CTU-based SAO parameters determination is used in the HEVC standard as the SAO parameters are decided using statistics of a single CTU. Some embodiments of the present invention decide SAO parameters using statistics of more than one CTU. During the processing of selecting an SAO mode from EO, BO and OFF, multiple CTUs are combined as a group for computing a set of parameters that optimize the rate and distortion (RD) cost. The cost corresponding to the optimized SAO parameters calculated by the multiple CTUs is called a combined cost. This combined cost is compared with a sum of the costs associated with the original CTU-based SAO parameters computed by individual CTU of the multiple CTUs. If the combined cost is lower, the SAO parameters calculated by the multiple CTUs are transmitted as the SAO information for a first CTU of the multiple CTUs, for example the first CTU is the upper-left-most CTU if the processing order of the CTUs is from top to bottom and left to right. The remaining CTUs of the multiple CTUs that contribute to the statistics are signaled with an SAO merge left flag or an SAO merge up flag to share the SAO parameters transmitted for the first CTU.

FIG. 11A illustrates the conventional CTU-based SAO parameters decision which derives the SAO parameters for each CTU according to the statistics of a single CTU. FIGS. 11B-11D illustrate some examples of grouping CTUs to derive combined SAO parameters according to embodiments of the present invention. The evaluation of whether to group CTUs together for SAO mode decision is made row-wise as shown in FIG. 11B. A combined cost associated with combined SAO parameters derived by statistics of a row of CTUs is compared with a sum of individual costs associated with SAO parameters derived by statistics of every individual CTU in the same row. In some embodiments, the encoder may group N CTUs in a CTU row to calculate the combined SAO parameters, where N is an integer greater than two and less than or equal to the total number of CTUs in the CTU row. An embodiment of the video encoder adaptively selects the best number of CTUs to be grouped by minimizing the combined cost associated with the combined SAO parameters. In the case of the combined cost is lower than the sum of individual costs, the combined SAO parameters derived by the statistics of a group of CTUs are transmitted in the CTU-level syntax of a left-most CTU in the group, and a SAO merge-left flag is transmitted for each of other CTUs in the group to indicate sharing of the combined SAO parameters. FIG. 11C shows an example of grouping CTUs in a CTU column direction for determining whether the SAO parameters are derived for a group of CTUs in the CTU column or the SAO parameters are derived for individual CTU in the CTU column. If the encoder decides to use combined SAO parameters derived by the group of CTUs in the CTU column, the combined SAO parameters are incorporated at the CTU-level syntax of the first processed CTU of the group (i.e. the top-most CTU in the group), and the other CTUs in the group share the combined SAO parameters by incorporating SAO merge-up flags in the video bitstream. FIG. 11D illustrates another example of grouping CTUs based on a predefined size M×N or predefined dimensions, where the predefined size is 3×3 in this example. After determining and calculating the combined SAO parameters for a group of CTUs, the combined SAO parameters are transmitted for a first processed CTU of the CTU group, which is the top-left CTU of the CTU group. Each of the CTUs in the left-most row of the CTU group uses an SAO merge-up flag and each of the other CTUs in the CTU group uses an SAO merge-left flag to share the combined SAO parameters transmitted for the first processed CTU.

Embodiments of deriving SAO parameters by multiple CTUs may be implemented in a video encoding system without modifying any SAO syntax design. In one embodiment, the video encoding system tries more than one size of CTU grouping for SAO parameters computation or more than one grouping orientation, for example, the video encoding system groups a current CTU with remaining CTUs in the same CTU row to compute a first set of SAO parameters and groups a current CTU with neighboring CTUs in a predefined size M×N to compute a second set of SAO parameters. A first cost associated with the first set of SAO parameters is compared with a second cost associated with the second set of SAO parameters, and the SAO parameters corresponding to a lower cost are selected for the current CTU.

Figure 12:
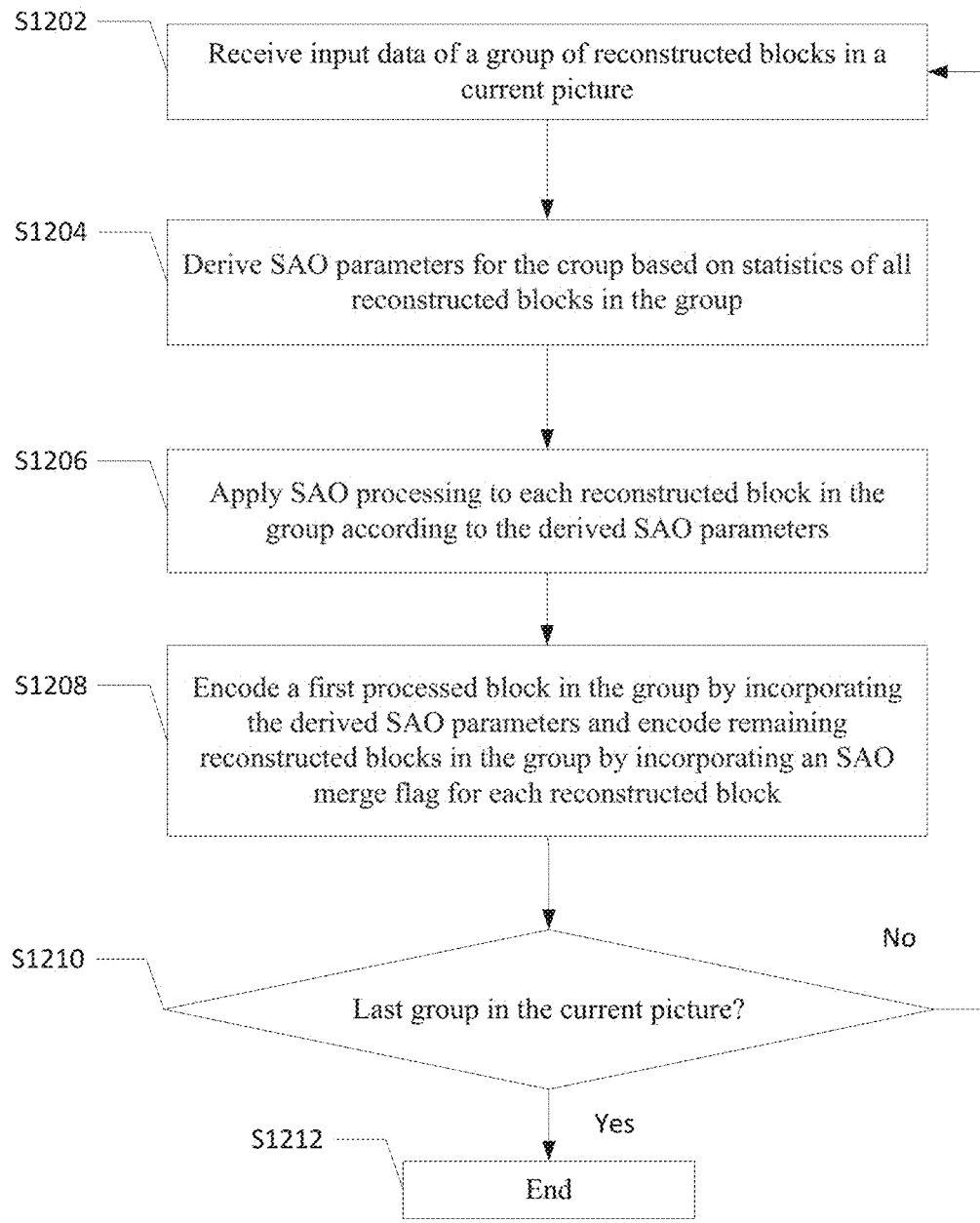
FIG. 12 illustrates an exemplary flowchart for a video processing including SAO processing in a video encoding system in accordance with an embodiment of the present invention.

FIG. 12 is a flowchart illustrating an embodiment of deriving SAO parameters according to statistics of multiple reconstructed blocks in a video encoding system. The video encoding system receives input data of a group of reconstructed blocks in a current picture in step S1202, and derives SAO parameters for the group of reconstructed blocks based on statistics of all reconstructed blocks in the group in step S1204. For example, the group is consisting of N reconstructed blocks in a row of reconstructed blocks, N reconstructed blocks in a column of reconstructed blocks, or M×N reconstructed blocks. The reconstructed block may be a CTU defined in the HEVC standard. The video encoding system applies SAO processing to each reconstructed block in the group according to the derived SAO parameters in step S1206. In step 1208, a first processed block in the group is encoded by incorporating the derived SAO parameters and remaining reconstructed blocks in the group are encoded by incorporating an SAO merge flag for each reconstructed block. The processed group is checked to determine if it is the last group in the current picture in step S1210, the video processing is terminated in step S1212 if it is the last group, or the video encoding system repeats the video processing from step S1202 to step S1208 if it is not the last group in the current picture. The conventional video encoder derives SAO parameters for a current reconstructed block according to statistics of the current reconstructed block, and in some embodiments, the video encoding system may select to derive SAO parameters for the current reconstructed block according to the statistics of multiple reconstructed blocks including the current reconstructed block or according to the statistics of only the current reconstructed block. For example, the video encoding system computes a combined rate distortion cost associated with combined SAO parameters, computes individual rate-distortion costs associated with individual SAO parameters derived for each individual reconstructed block, compares the combined rate-distortion cost with a sum of the individual rate-distortion costs, and selects the SAO parameters corresponding to the lower cost between the combined rate-distortion cost and the sum of the individual rate-distortion costs. If the video encoding system selects the individual SAO parameters, each reconstructed block in the group is encoded by incorporating the individual SAO parameters.

The flowcharts shown in FIG. 8, FIG. 10, and FIG. 12 are intended to illustrate examples of video processing including SAO processing according to various embodiments of the present invention. A person skilled in the art may modify each step, re-arranges the steps, split a step, or combine steps to practice the present invention without departing from the spirit of the present invention.

Implementation Examples Various embodiments of the SAO processing described in the present invention may be implemented in SAO 130 of the Video Encoder 100 or SAO 226 of the Video Decoder 200. SAO 130 and SAO 226 may be implemented by hardware components, one or more processors configured to execute program instructions stored in a memory, or a combination of hardware and processor. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention. For example, a processor executes program instructions to control receiving of input data associated with a current picture. The processor is equipped with a single or multiple processing cores. For example, the processor executes program instructions to perform functions in SAO 130 and SAO 226, and the memory electrically coupled with the processor is used to store the program instruction, information corresponding to the reconstructed images of blocks, and/or intermediate data during the encoding or decoding process. The memory in some embodiments includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable medium listed above. The Video Encoder 100 and Video Decoder 200 may be implemented in the same electronic device, so various functional components of the Video Encoder 100 and Video Decoder 200 may be shared or reused if implemented in the same electronic device.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video processing for a video coding system, the method comprising:
   receiving input data associated with a current reconstructed block in a current picture;
   determining a Sample Adaptive Offset (SAO) type for the current reconstructed block;
   determining a plurality of SAO offsets for the current reconstructed block and checking if all SAO offsets are zeros except for a last SAO offset if the SAO type for the current reconstructed block is Edge offset (EO) or Band Offset (BO);
   if all SAO offsets except for the last SAO offset are zeros, deriving a new value for the last SAO offset when encoding the current reconstructed block or deriving an original value for the last SAO offset when decoding the current reconstructed block, wherein the new value for the last SAO offset is derived by subtracting the original value for the last SAO offset by one, and the original value for the last SAO offset is derived by adding one to a received value for the last SAO offset;
   applying SAO processing to the current reconstructed block according to the SAO offsets, wherein the original value for the last SAO offset is used in SAO processing and the new value for the last SAO offset is signaled in a video bitstream; and
   encoding or decoding the current reconstructed block.

2. The method of claim 1, wherein the current reconstructed block is for a luminance (luma) component, four SAO offsets are determined for the current reconstructed block, and the last SAO offset is the fourth SAO offset.

3. The method of claim 1, wherein the current reconstructed block is for a chrominance (chroma) component, eight SAO offsets are determined for the current reconstructed block and another reconstructed block for another chroma component, and the last SAO offset is the eighth SAO offset.

4. The method of claim 1, wherein the SAO processing is skipped if the SAO type for the current reconstructed block is OFF.

5. The method of claim 1, wherein the current reconstructed block is a Coding Tree Block (CTB).

6. An apparatus of processing video data in a video coding system, the apparatus comprising one or more electronic circuits configured for:
   receiving input data associated with a current reconstructed block in a current picture;
   determining a Sample Adaptive Offset (SAO) type for the current reconstructed block;
   determining a plurality of SAO offsets for the current reconstructed block and checking if all SAO offsets are zeros except for a last SAO offset if the SAO type for the current reconstructed block is Edge offset (EO) or Band Offset (BO);
   if all SAO offsets except for the last SAO offset are zeros, deriving a new value for the last SAO offset when encoding the current reconstructed block or deriving an original value for the last SAO offset when decoding the current reconstructed block, wherein the new value for the last SAO offset is derived by subtracting the original value for the last SAO offset by one, and the original value for the last SAO offset is derived by adding one to a received value for the last SAO offset;
   applying SAO processing to the current reconstructed block according to the SAO offsets, wherein the original value for the last SAO offset is used in SAO processing and the new value for the last SAO offset is signaled in a video bitstream; and
   encoding or decoding the current reconstructed block.

7. A non-transitory computer readable medium storing program instruction causing a processing circuit of an apparatus to perform video processing method, and the method comprising:
   receiving input data associated with a current reconstructed block in a current picture;
   determining a Sample Adaptive Offset (SAO) type for the current reconstructed block;
   determining a plurality of SAO offsets for the current reconstructed block and checking if all SAO offsets are zeros except for a last SAO offset if the SAO type for the current reconstructed block is Edge offset (EO) or Band Offset (BO);
   if all SAO offsets except for the last SAO offset are zeros, deriving a new value for the last SAO offset when encoding the current reconstructed block or deriving an original value for the last SAO offset when decoding the current reconstructed block, wherein the new value for the last SAO offset is derived by subtracting the original value for the last SAO offset by one, and the original value for the last SAO offset is derived by adding one to a received value for the last SAO offset;

applying SAO processing to the current reconstructed block according to the SAO offsets, wherein the original value for the last SAO offset is used in SAO processing and the new value for the last SAO offset is signaled in a video bitstream; and encoding or decoding the current reconstructed block.

\* \* \* \* \*